Figures 7, 8, 9:
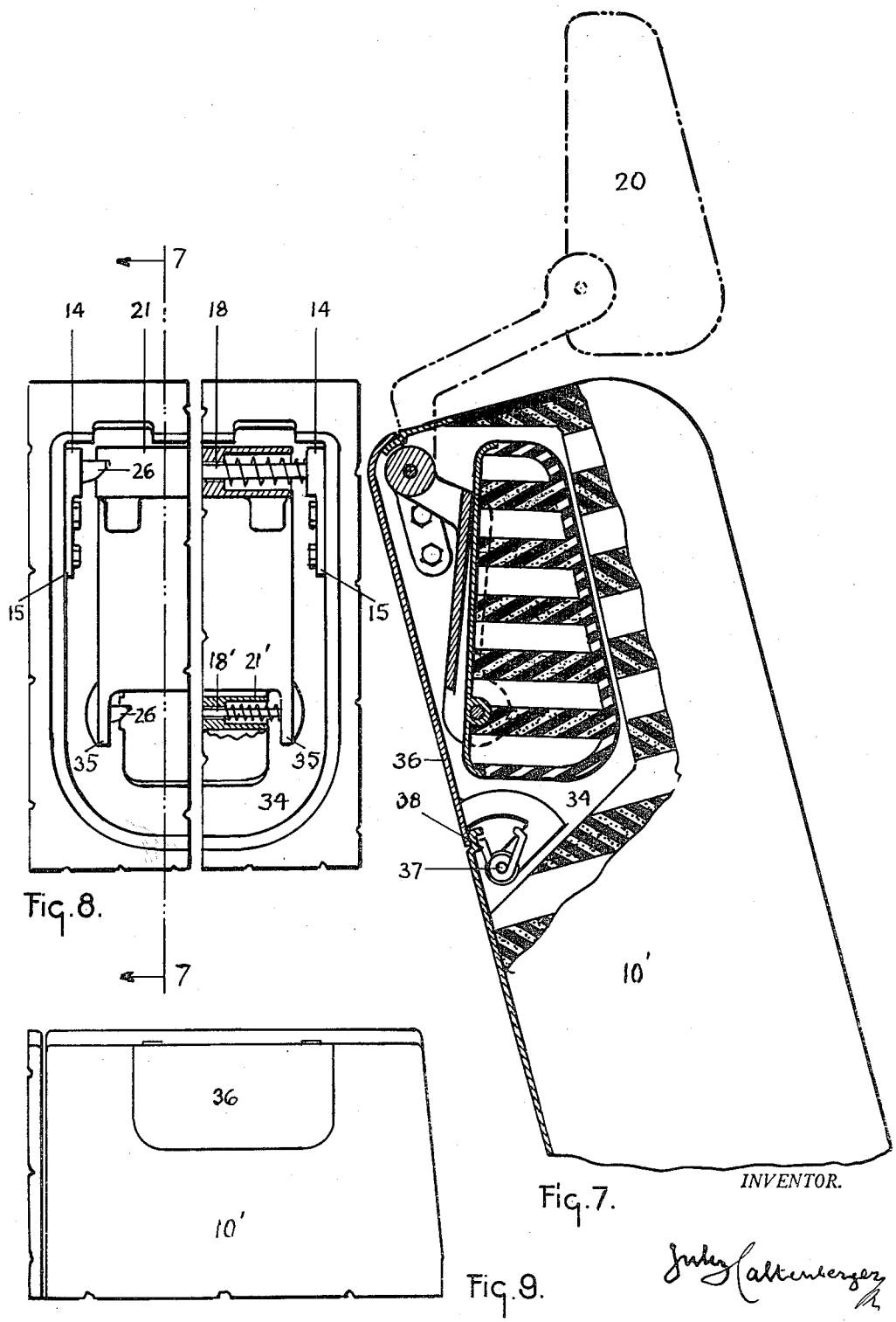

March 23, 1965 J. HALTENBERGER 3,174,799
AUTOMOBILE SEAT WITH ADJUSTABLE HEADREST
Filed Dec. 8, 1961 2 Sheets-Sheet 1
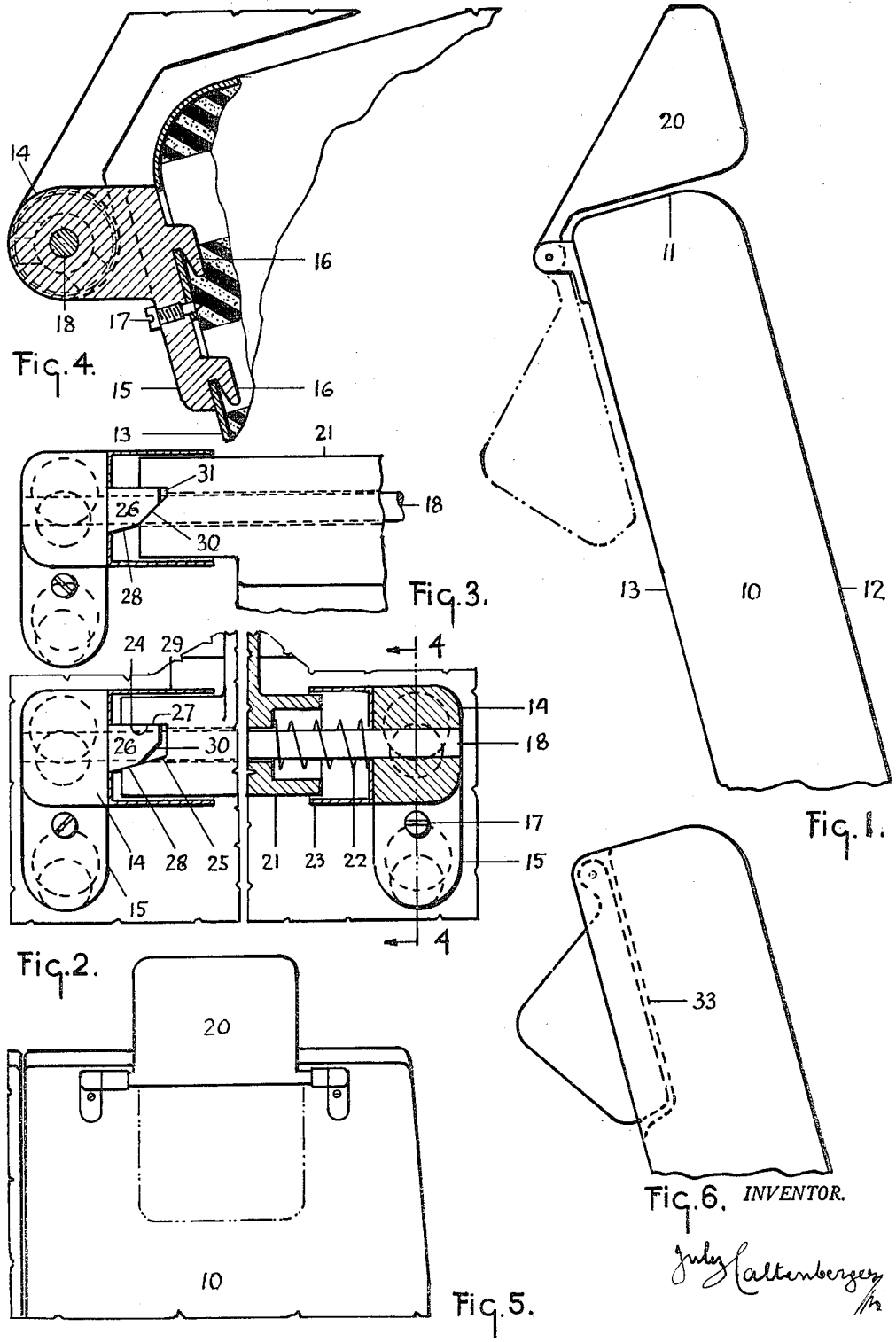

INVENTOR.

United States Patent Office 3,174,799
Patented Mar. 23, 1965

3,174,799
AUTOMOBILE SEAT WITH ADJUSTABLE HEADREST
Jules Haltenberger, Box 131, Rancho Santa Fe, Calif.
Filed Dec. 8, 1961, Ser. No. 158,018
5 Claims. (Cl. 297—403)

The present invention relates to automobile seat passengers' ride comforters, whenever riding in a seat with stationary backrests, and more particularly when the backrest is tiltable rearwardly. The adoption of tiltable backrests is the next major step for seat comfort; newly opened turnpikes and freeways do materially increase the lengths of auto trips.

Headrests are not new per se; it is here proposed, and is the object of my invention to hinge mount a headrest on the back part of a backrest for storing it in its retracted position; when contemplating to use it as a pillow, the headrest needs to be extended by rotating it forwardly, and locking it automatically in the extended position.

A further object is to store the headrest in a depression of the backrest rear wall.

A further object is to store the backrest in a pocket in the backrest front and rear walls.

Further objects will appear as the description proceeds.

Referring to the drawings: FIG. 1 is a side elevation of an automobile seat backrest showing the headrest positions; FIG. 2 is a rear elevation of the extended headrest hinge shown in FIG. 1, here illustrated in a larger scale; FIG. 3 illustrates the hinge wedge lock when the headrest is retracted; FIG. 4 is a section taken substantially on line 4—4 of FIG. 2; FIG. 5 is a rear elevation of the head and backrest shown in a smaller scale; FIG. 6 is a modification of the storing of a headrest; FIG. 7 is a fragmental side elevation of a larger scale backrest, the section taken substantially on line 7—7 of FIG. 8, showing a nested-in headrest; FIG. 8 is a fragmental rear elevation of FIG. 7 with the headrest concealing door omitted; FIG. 9 is a rear elevation of the backrest, indicating the headrest access door and shown in a reduced scale.

Referring to FIGS. 1 to 5, inclusive, it will be seen that an automobile seat backrest 10 has a yielding top wall 11, a yielding front wall 12, and a back wall 13. The back wall after drilling in it four relatively large and two relatively small holes is ready for adoption of a headrest hinge bracket, having stationary hubs 14, downwardly extending legs 15, hole engaging hooks 16 thereon, bracket engagement assuring set screws 17, and having a headrest hinge rod 18.

A front padded headrest 20 is provided with a hinge hub 21, having a central hole therein, with just enough clearance to assure free rotation or sliding of the headrest and hub respectively on said rod 18. One end of the hub is countersunk for the adoption of a coil compression spring 22; for hiding same a thimble 23 is provided. The other end of the hub has a wedge opening with a lineal face 24, and a slightly slanted face 25, for engaging of a wedge 26, under the pressure of the coil spring 22.

It is important to note, that the wedge has a lineal face 27 and a slightly slanted face 28; when the headrest is extended these are in contact with the hub opening. Here the slightly slanted face assures a positive and play-less lock for the headrest; however, the slant is not steep enough for it to release the locked position when the headrest is under rotational pressure on the hinge rod. This headrest extended position lock is instantly releasable, by sliding the headrest away from the wedge, while further compressing the coil spring. The wedge structure is hidden by thimble 29.

It will be noted that the wedge is also provided with a steep slanted face 30, for the engagement with retracted position of wedge opening 31, shown in FIG. 3, which steep angle assures a release by simply rotating the headrest on its rod and towards its extended position, a component of force will automatically compress the coil spring. As is clear from FIG. 3, the retracted position wedge opening is only about half as deep as the extended position opening. Applicant illustrates a stationary wedge and two wedge openings in the headrest hub, for all intent and purposes, the bracket could be provided with two openings and in such event the hub would be the one provided with a wedge.

In operation, the headrest, normally stored, depends from its hinge. The passenger by getting hold on the headrest simply rotates it upwardly (a slight lateral motion will automatically occur) until the headrest reaches the desired extended position, when it automatically snaps laterally into its lock. To release: after a lengthwise slide while compressing the coil spring, the headrest is thrown rearwardly; it automatically will be rotation releasably held in retracted position by the coil spring and wedge nose.

The proposal is applicable to automobile front seat backs now in use; therefore, in this form it is an accessory.

When it is desired, the backrest back wall might be dented in at 33, as shown in FIG. 6. The thinning of the cushion on the top of the backrest could hardly be noticed by the passenger.

When it is desired, the headrest, when retracted, is hidden, as shown in FIGS. 7, 8 and 9. Here, between the headrest 20 and stationary hubs 14, and downwardly extending legs 15, secured in a pocket 34, in the backrest 10′, having hinge rod 18, and hinge hub 21; an additional hinge is provided having a hinge rod 18′ held by hubs 35. The wedge means, for holding the headrest locked in both hinges when the backrest is extended, and also the means for rotation release holding both hinge means of the retracted headrest (retracted hung positions are shown in FIG. 8 are duplicates of, and were described in connection with FIGS. 1 to 5 inclusive; therefore, the indicating numerals are also duplicated. Here, the retracted headrest is out of sight, inasmuch as a door 36, on hinge 37, by hinge spring 38 is yieldingly held in closed position.

In operation: The passenger opens the door, reaches in the pocket and pulls out and rotates the headrest towards its useful extended position; in this process both hinges automatically lock for holding the headrest in extended position.

A lateral pull disengages both wedge locks and rearward rotation will place both hinges in retracted rotation release holding position as shown in FIG. 7.

It will be noted that the backrest when folded into the backrest pocket has its padded portion placed forwardly in the vehicle; therefore, the backrest yielding cushion effect is not interfered with.

It is believed that a quickly and facilely accessible headrest will materially increase the ride comfort on long trips, and particularly when rearward tilted backrests are used.

While I have herein shown and described only certain specific embodiments of my invention and have suggested only certain possible modifications, it will be appreciated that many changes and variations can be made to suit particular conditions and embodiments of use, without departing from the spirit and scope of my invention.

What applicant claims as his invention is:
1. In an automobile seat including a backrest having top and front and rear walls, the improvement comprising a padded headrest, means mounting the headrest on the backrest for vertical swinging movement between an extended position in which the headrest is above the top wall and a retracted position in which the headrest is below the top wall, means releasably locking the headrest in said extended and retracted positions, and means mounting the headrest for bodily lateral movement to disengage the headrest from said locking means to permit raising and lowering of the headrest between said extended and retracted positions, said locking means comprising wedge means and means having a pair of recesses, one of said wedge means and recessed means being mounted on the backrest and the other of said wedge means and recessed means being mounted for vertical swinging movement with the headrest, the wedge means having a more steeply inclined face and a less steeply inclined face, each of the recesses being complementary to one of the wedge faces, the recesses being so disposed that the more steeply inclined wedge face is seated in its corresponding recess when the headrest is in said retracted position and the less steeply inclined wedge face is seated in its complementary recess when the headrest is in said extended position.

2. A structure as claimed in claim 1, and means continuously yieldably urging said wedge faces into said recesses in the extended and retracted positions of the headrest.

3. In an automobile seat including a backrest having top and rear walls and a padded front wall, the improvement comprising a front-padded headrest, means mounting the headrest on the backrest for vertical swinging movement between an extended position in which the headrest is above the top wall and a retracted position in which the headrest is below the top wall with the padded front of the headrest facing front and disposed immediately behind the padded front wall of the backrest.

4. A structure as claimed in claim 3, the headrest in said retracted position being disposed forwardly of the rear wall of the backrest.

5. A structure as claimed in claim 3, said mounting means comprising linkage including a pair of pivots articulated about spaced parallel axes.

References Cited in the file of this patent

UNITED STATES PATENTS

| | | |
|---|---|---|
| 1,717,568 | Koenigkramer | June 18, 1929 |
| 1,856,297 | St. Marie et al. | May 3, 1932 |
| 1,930,867 | West | Oct. 17, 1933 |
| 2,045,225 | Glasgow | June 23, 1936 |
| 2,971,601 | Fortune | Feb. 14, 1961 |
| 3,008,766 | Bontempi et al. | Nov. 14, 1961 |
| 3,008,767 | Fox | Nov. 14, 1961 |
| 3,043,626 | Requa | July 10, 1962 |
| 3,046,057 | Smetko | July 24, 1962 |